INVENTOR.
GEORGES ROUZIER

United States Patent Office
3,592,799
Patented July 13, 1971

1

3,592,799
METHOD FOR THE MANUFACTURE OF SYNTHETIC ELASTOMERS AND PRODUCTS OBTAINED BY SUCH METHOD
Georges Rouzier, Clermont-Ferrand, France, assignor to Compagnie Generale des Etablissements, Michelin, raison sociale Michelin & Cie, Clermont-Ferrand, Puy-de-Dome, France
Filed Apr. 28, 1966, Ser. No. 546,022
Claims priority, application France, Apr. 29, 1965, 15,253
Int. Cl. C08f 15/04; C08d 1/20, 1/36
U.S. Cl. 260—83.7
14 Claims

ABSTRACT OF THE DISCLOSURE

A process for the preparation of polymers having a polymodal molecular weight distribution wherein a conjugated diene monomer compound is polymerized by means of an organic lithium polymerization catalyst and when a fraction of the monomer has polymerized then adding to the reaction medium an organic halide.

---

Figure 1:
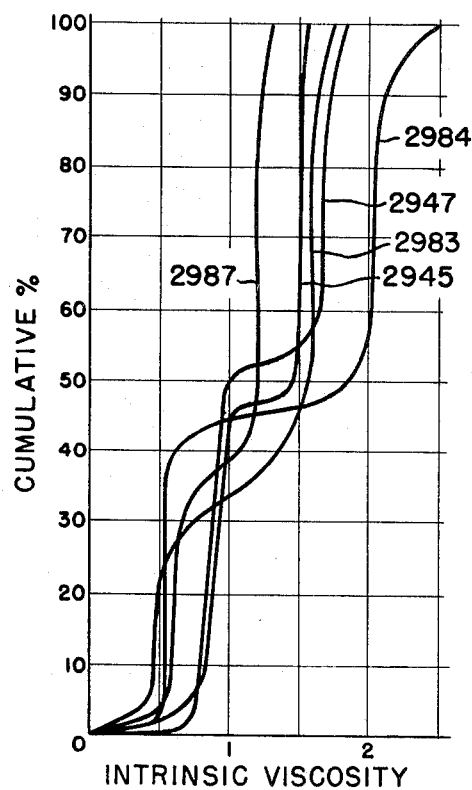

The present invention relates to a method for the manufacture of synthetic elastomers by polymerization or copolymerization of conjugated dienes or by copolymerization of conjugated dienes and aromatic vinyl compounds, such method making use in a special and new manner of organo-alkaline and especially organo-lithium catalysts. It also relates to the polymers or copolymers, especially the synthetic elastomers, which can be obtained by means of this method.

It is known that the polymers or copolymers of conjugated dienes and the copolymers of conjugated dienes and aromatic vinyl compounds prepared in solution in aliphatic or aromatic hydrocarbons, possibly in the presence of traces of polar compounds, by means of organo-lithium compounds, generally show a very narrow distribution of the molecular weights of the macromolecules constituting them. More than half of the macromolecules have a molecular weight which deviates but little from the mean molecular weight. It is then said that these polymers or copolymers are monodispersed.

This special characteristic which is related to the kind of catalyst used is the source of advantages and of disadvantages. In particular, one attributes to the narrow distribution of the molecular weights the often outstanding qualities of vulcanizates prepared from monodispersed elastomers, especially elastomers prepared by means of organolithium catalyst. On the other hand, the narrow distribution of the molecular weights is the cause of a grave shortcoming. Thus, a monodispersed elastomer with an average molecular weight corresponding to an ML4 Mooney viscosity index at 100° C. of close to 50 can be used in practice only with difficulty if used all by itself in classical rubber treatment, since its employment is a particularly delicate manner: it cannot be worked on the customary machines in large quantities since the elastomer does not adhere to the rollers or cylinders of mixers and calenders; it disintegrates, does not easily absorb the materials to be incorporated into it, it heats up excessively, etc.

If, in order to remove these difficulties or this impossibility of use, one works with elastomers having a lower mean molecular weight but still belonging to the same kind, for example elastomers having a Mooney index of about 30, the use of such elastomers may be achieved under more favorable conditions but this achievement is obtained at the expense of the good quality of the vulcanizates. Furthermore, there is another defect which, though to a lesser degree, may be observed in monodispersed prod-

2 ucts having a high Mooney index but which becomes dominant and most troublesome in elastomers having a low Mooney index. It is cold flowing in non-vulcanized condition, which causes grave inconveniences during packing, transportation and storing of the rubbers.

It is the object of the invention to prepare by modifying the distribution of the molecular weights of the macromolecules obtained by means of a catalyst of the known kind, elastomers of a new structure which are much easier to use while at the same time having much better resistance to cold flowing and furnishing vulcanizates with characteristics which are at least comparable to the characteristics of vulcanizates of the classical elastomers obtained in solution by means of an organic lithium catalyst. Essentially, the polymers or copolymers in accordance with the invention present a bi-modal or poly-modal distribution of the molecular weights, or in any case a broad distribution of the molecular weights which is obtained by differentiated growth of the chains of the polymers in contrast to a narrow distribution which is obtained by simultaneous and equal growth of all the chains.

The distribution of the molecular weights of a polymer is called bi-modal (or more generally speaking polymodal) if the differential curve of distribution of the molecular weight shows two (or more) maxima, or if, which amounts to the same thing, the integral curve of distribution of the molecular weights, more directly accessible, shows a number of points of inflection equalling 3 (or a whole and odd number higher than 3).

It is known that the differential curve of distribution of the molecular weights of an elastomer is the curve representing the continuous variation of the density of distribution of the macromolecules as a function of the molecular weight. It is often represented as a function of the intrinsic viscosity as the latter factor is more accessible to experimentation than the molecular weight to which it may be related functionally. The integral curve of distribution of the molecular weights which is the primary of the preceding one furnishes the ratio of macromolecules the molecular weight of which is lower than or equal to such chosen value. For the reason described above, it is often represented in terms of intrinsic viscosity.

A bi-modal distribution is thus a distribution wherein the two values for the molecular weight of the macromolecules are more frequent than all the others. If these values differ from each other considerably, and if the macromolecules are grouped very close to these two values, the polymer for all practical purposes consists of a share with a high molecular weight and a share with a low molecular weight. In such a case, the macromolecules with the low molecular weight serve as some sort of plasticizer for the others and improve the putting to use of the elastomer. On the other hand, the macromolecules with the high molecular weight confer upon the elastomer a certain holding ability preventing cold flowing due to the small macromolecules and providing the product even with a certain "toughness." Furthermore, they impart to the vulcanizates qualities comparable to the qualities of vulcanizates of monodispersed elastomers having a high molecular weight.

The method in accordance with the invention enables one to escape the distribution of the molecular weights as imposed by the catalytic system and to model at will the distribution of the molecular weights of elastomers obtained by polymerization in solution by means of an organic lithium catalyst. Until now, only use of this catalytic system for the obtention of monodispersed polymers was known.

A noteworthy characteristic of the polymers or copolymers in accordance with the invention is that their poly-modal distribution is obtained in situ, i.e., by differentiated growth of their macromolecular chains. Actually, one may obtain bi- or poly-modal polymers by mixing two or more monodispersed polymers, this mixing being accomplished by means of the customary cylinder mixer, or rather from polymers which are still in solution. However, even in the latter case, it is difficult to obtain a mixture which is as completely homogeneous as when the macromolecular chains constitute themselves or develop in the presence of one another, as becomes possible under the method in accordance with the invention.

The method in accordance with the invention for the obtention of bi- or poly-modal polymers or copolymers in solution in hydrocarbons by means of anionic catalysts, especially organic lithium catalysts, consists in arresting the growth of part of the chains in the process of polymerization by introducing, once or several times, a compound destroying a portion of the active terminal sites and, by preference, activating the residual sites.

As adjuvant one may use any compound capable of destroying the carbon-alkali metal bond, for example, alcohols, acids, primary and secondary amines, products with mobile hydrogen, ketones and aldehydes, etc., of course, subject to the condition that one uses the compound in a quantity whereby only part of the active sites is destroyed. However, use of such compounds which play only a passive part, namely that of arresting the growth of a certain number of macromolecules, without activation of the growth of the residual macromolecular chains, does enable one only to obtain bi- or poly-modal polymers or copolymers the part of which having a high molecular weight will be either too small or of insufficient molecular weight in order to raise the characteristics of the vulcanizates to acceptable values.

This is due to the fact that by the classical organic lithium catalysis, one is unable to obtain, within a reasonable time and under easily reproducible conditions, polymers or copolymers having a high molecular weight. Actually, one must use a very weak catalyst concentration. The catalytic system is very sensitive to impurities of the reaction medium. Permanent regulation of a weak residual catalyst concentration is a problem which cannot be solved industrially and which is delicate even in a laboratory. However, whenever the catalyst concentration decreases, the speed of polymerization, even at a high temperature, becomes insufficient for obtention of an acceptable yield within a reasonable time.

In accordance with the invention, it is advisable to use an adjuvant such as those described in U.S. application Ser. No. 470,924, filed July 9, 1965, i.e., an organic mono- or poly--halide wherein at least one halogen atom is carried by a carbon atom situated in the alpha position of a double ethylene bond or of an aromatic nucleus.

Delayed introduction of this adjuvant, all at once or during several times, enables one not only to arrest the growth of a certain number of macromolecular chains but also to activate at a considerable rate the growth of other chains, in accordance with a mechanism unknown. It follows that the addition of such a compound, by enabling only certain given macromolecules to continue their development, and doing so relatively rapidly, results in the obtention in situ of successively two or several monodispersed polymers having different mean molecular weights, one of them at least having a high molecular weight, and thus of a bi- or poly-modal polymer.

The various factors which may influence the regulation of the distribution of the molecular weights of the various polymers or copolymers under the method in accordance with the invention are in particular: the choice of the halogen compound and of the organic alkali or organic lithium catalyst; the ratio of the concentrations of these two compounds; selection of the moment of introduction of the halogen compound into the reaction medium; temperature; the polarity of the reaction medium.

The method is applicable to the polymerization of all conjugated dienes, especially butadiene, isoprene, dimethyl butadiene, piperylene, etc., as well as to copolymerization of these dienes with one another at all extents.

It is likewise applicable to the copolymerization of one conjugated diene, especially one of the aforementioned dienes, with aromatic vinyl compounds, such as styrene, alphamethyl styrene, vinyl toluene, divinyl benzene, vinyl naphthalene, etc., likewise to all extents. Obviously, the method may also be used for copolymerization of more than two constituents selected from among the conjugated dienes and the aromatic vinyl compounds.

The method applies essentially to polymerizations and copolymerizations in solution. Usable solvents are aliphatic hydrocarbons, both cyclic and non-cyclic, such as the various heptanes, hexanes, cyclohexanes, etc., or mixtures of such hydrocarbons, for example, saturated cuts of distillation of petroleum products, or aromatic hydrocarbons, such as benzene, toluene, etc.

The method applies likewise in cases where polymerization and copolymerization are effected in the presence of larger or smaller quantities of non-protogenic polar compounds modifying the dielectric constant of the reaction medium for the purpose of either increasing speeds of polymerization or modifying the steric configuration of the polymer, or also for the purpose of modification of the reactivity of two or more monomers in the process of copolymerization. As examples of polar compounds, one may mention diethyl ether, dioxane, certain thioethers, tetrahydrofurane, triethyl amine, hexamethyl phosphorotriamide, etc.

The catalytic system comprises an organic alkali compound, preferably an organic lithium compound, and is modified once or several times by a halogen compound.

By organic alkali or organic lithium compound one designates any organic metal compound containing one or more carbon-alkali or carbon-lithium bonds capable of causing in solution in a hydrocarbon the polymerization of conjugated dienes and/or aromatic vinyl compounds in accordance with the classical mechanism of anionic polymerization. As examples, one may mention normal-butyl lithium, secondary and tertiary butyl lithium, ethyl lithium, dilithiobutane, dilithionaphthalene, etc. By extenson, the invention applies also to all lithium or alkali metal compounds or complexes capable of causing anionic polymerization. The most common and the easiest to use among these different compounds seems to be n-butyl lithium.

The compound modifying the catalyst is an organic mono- or polyhalide comprising at least one halogen atom carried by a carbon atom situated in alpha position of an ethylene double bond or an aromatic nucleus. As examples, one may mention 1,4-diiodo-2-butene, 1,4-dibromo-2-butene, 3,4-dibromo-1-butene, 1-bromo-2-butene, allyl iodide, bromide or chloride, benzyl chloride, etc. Thus the halogen compounds which may be used are characterized by a certain mobility of the halogen atom or atoms, due to the presence in the body of the molecule of an allyl double bond or of an aromatic nucleus adjoining the carbon atom carrying the halogen. In this connection, the chlorine compounds are the least reactive inasmuch as chlorine is the least mobile of the three ordinary halogens. However, it may be preferable that the mobility of the halogen not be too great, and bromine compounds are in general more active than the chlorine compounds and the iodine compounds. Among the bromine compounds, one of the most active is the allyl bromide.

It is advisable that the relationship $X/L$, i.e., of the total number $X$ of halogen atoms introduced by the mono- or polyhalide compound to the number $L$ of lithium atoms contributed by the lithium compound be for practical purposes from 0.1 to 1, and by preference from 0.3 to 1, especially for the usual concentration of monolithium compound ranging from 0.01 to 0.20 mol per 100 mols of monomer, or for the equivalent concentrations of polylithium compound.

In case one does not stay within the limits indicated for the relationship $X/L$, the deviation (spread) of the mean molecular weight between the different types of macromolecules of the bi- or poly-modal polymer is too slight if there is not enough halogen compound, and the accelerating effect obtained by the halogen compound becomes negligible; in case of an excess of halogen compound, the reaction is completely arrested at the moment of introduction of this compound or is slowed down in an undesirable manner.

The optimal values for the ratio $X/L$ and the concentration of lithium compound depend of course on the nature of the elastomer or elastomers, the organic lithium compound and the halogen compound, the duration of the various phases of polymerization and obviously the characteristics of the final product desired.

If one wishes to obtain a bi-model polymer, it is suitable to add the halogen compound all at once. However, an important factor is the moment at which the halogen compound is introduced. If one introduces it too soon or too late, i.e., when the rate of conversion is low or, otherwise, already very high, the modification of the structure in relation to that of a polymer or a monodispersed copolymer is obviously very slight. One obtains a clearly bimodal distribution if one introduces the halogen compound whenever a substantial share, for example 20% to 80% of the monomer or monomers is polymerized.

In case one desires to obtain a poly-modal polymer, it it advisable to introduce the halogen compound in several portions so as to arrest each time the growth of a part of the macromolecular chains produced after the start of polymerization. One may also introduce the halogen compound in a continuous manner at a suitably regulated speed, either uniform or variable, in order to obtain, for example, a polymer or copolymer the molecular weight of which is distributed substantially uniformly within a sufficiently large interval, i.e., without much marked preponderance of one or more special values of the molecular weight. The latter result may also be obtained by using a halogen compound with slow and progressive action, such as, for example, benzyl chloride.

In a particularly interesting variant of the invention, one may modify at the time of introduction of the halogen compound the conditions of polymerization.

For example, one may modify the temperature in order to accelerate or slow down the reaction, one may modify the polarity of the reaction medium by introduction of a polar compound or a supplement to the polar compound at the time of addition of the halogen compound, in order to influence especially the speed of polymerization or the steric configuration of the polymer. At the time one introduces the halogen compound, one may also introduce a polymerizable monomer supplement, or also a monomer which is different from the monomer or monomers already present, or even a partially polymerized monomer solution wherein the molecular weight of the macromolecules is different from the weight of the macromolecules as attained in the reaction medium. Thus, it becomes possible to introduce a supplement of solvent at the time one adds some new monomer. The importance of these modifications lies in the increased number of possibilities of the method in that one is able to cause the molecular weight distribution to vary, to differentiate the composition (later introduction of a new monomer) or the structure (modification of polarity, for example) of the marcomolecules having high and low molecular weights.

Some of the possibilities offered by the invention are illustrated by the following examples which are designed to facilitate comprehension of the invention but not to limit its scope. In all examples polymerization was carried out in 250 cm.³ bottles cleaned in advance with rectified nitrogen, provided with a cap permitting tight closing, the reagents being introduced by means of a graduated syringe. The quantity of the solvent used was in all cases corresponding to a volume of 180 cm.³. On the other hand, the quantity of monomer used is $\frac{1}{10}$ by weight of the solvent in the case of an aliphatic solvent and $\frac{1}{12}$ in the case of an aromatic solvent. It should be noted that the concentrations of organic lithium compound given in the examples are the concentrations of the active product, i.e., the quantities of catalyst actually introduced are slightly larger as, in order to make allowances for the impurities present in the polymerization medium, the exact ratio of such impurities was established in advance for each product participating in the polymerization medium and introduced into the bottles. The quantities of catalyst, halogen adjuvant and polar compounds are expressed in pcm., one pcm. equalling one part by weight per one hundred parts by weight of monomer: in other words, 0.08 pcm. of catalyst for a monomer weighing 12.75 g. corresponds to $$0.08 \times \frac{12.75}{100}$$

grams, i.e., 10.2 milligrams. These reagents which are used in small doses are introduced in the form of titrated solutions and the solvent used is heptane.

Generally speaking, the products were introduced into the bottle in the following order: the solvent, the monomer or monomers, the catalyst, possibly the polar compound or compounds. Thereafter the bottles were placed on a rotating drum immersed in a liquid thermostatically kept at the desired temperature. At the end of a varying time span, the bottles were removed from the drum, their caps were carefully dried whereafter one introduced the halogen compound and, in the pertinent cases, various other products (monomers, polar compounds, solvents). Thereafter, the bottles were returned to the thermostatically controlled drum to continue polymerization there at a temperature which may possibly be modified.

In the examples, the molecular weight of the polymers or fractions of polymers is indicated only by reference to the intrinsic viscosity. As we know, there exists a correlation between viscosity and molecular weight both of which vary always in the same direction. For all polymerizations carried out, the intrinsic viscosity of the product obtained was always determined at 30° C. in a cyclohexane solution and is indicated. Furthermore, for a certain number of particularly representative cases, there is furnished in the drawings (FIGS. 1–4) the integral curve of distribution of the intrinsic viscosity obtained by fractonation of the polymer by means of elution. This curve furnishes a representative picture of the distribution of the molecular weights. Measurements of intrinsic viscosity and fractionation of the polymers were undertaken in accordance with known techniques which need not be stated herein.

EXAMPLE 1

Solvent: toluene (180 cm.³)
Monomer: butadiene (12.75 g.)
Catalyst: n-butyl-lithium at a rate of 0.08 pcm.
Adjuvant: allyl bromide (symbol BrA) in variable quantity
Temperature: 55° C.
Total duration; 3 hours In this example, a series of tests was undertaken by varying the quantity of allyl bromide and also the moment after the reaction has started at which this compound is introduced. Table I below reflects the various test conditions and the corresponding results.

TABLE I

| No. | BrA, pcm. | Lag, min. | Conversion, percent | Viscosity | Curve No. in Fig. 1 |
|---|---|---|---|---|---|
| 1 | 0.08 | 0 | 98 | 1.92 | |
| 2 | 0.10 | 0 | 98 | 2.32 | |
| 3 | 0.08 | 20 | 98 | 1.26 | 2,945 |
| 4 | 0.10 | 20 | 99 | 1.34 | 2,947 |
| 5 | 0.08 | 40 | 97 | 1.22 | |
| 6 | 0.10 | 40 | 97.5 | 1.26 | |
| 7 | 0.08 | 60 | 98.5 | 1.19 | |
| 8 | 0.10 | 60 | 98 | 1.22 | |

The ratio $X/L$ is close to 0.53 in the tests with odd numbers and close to 0.66 in the others. If one uses less allyl bromide, the viscosity of the polymer is lower and the same is true for the mean molecular weight. However, the different lessens as the allyl bromide is introduced later and later, i.e., as a larger and larger share of the monomer has been polymerized before the introduction of this compound. If the allyl bromide is introduced right at the start of the reaction, the polymer is mono-dispersed. On the other hand, as shown in curves 2945 and 2947, if it is introduced after 20 minutes, one obtains polymers with a clearly bimodal distribution, consisting of two fractions: one with a viscosity close to 0.95, the other one with a viscosity of about 1.5 (curve 2945) or 1.7 (curve 2947). If one uses more allyl bromide, the fraction with the high molecular weight is less abundant but has a higher mean molecular weight. Finally, if the allyl bromide is introduced after too long a lag, a large share of the monomer has become polymerized and the fraction having a high molecular weight is by necessity scant; after 60 minutes one finds practically the narrow distribution of the mono-dispersed polymers.

EXAMPLE 2

Solvent: Heptane (180 cm.$^3$)
Monomer: Butadiene (11.9 g.)
   Catalyst: n-butyl lithium at the rate of 0.08 pcm.
Adjuvant: 1,4-dibromo-2-butene (symbol DBB) in variable quantity
Temperature: 55° C.
Total duration: 3 hours This example differs from the preceding one by the choice of another solvent and another adjuvant. The Table II below furnishes the test conditions and the results.

TABLE II

Figure 2:
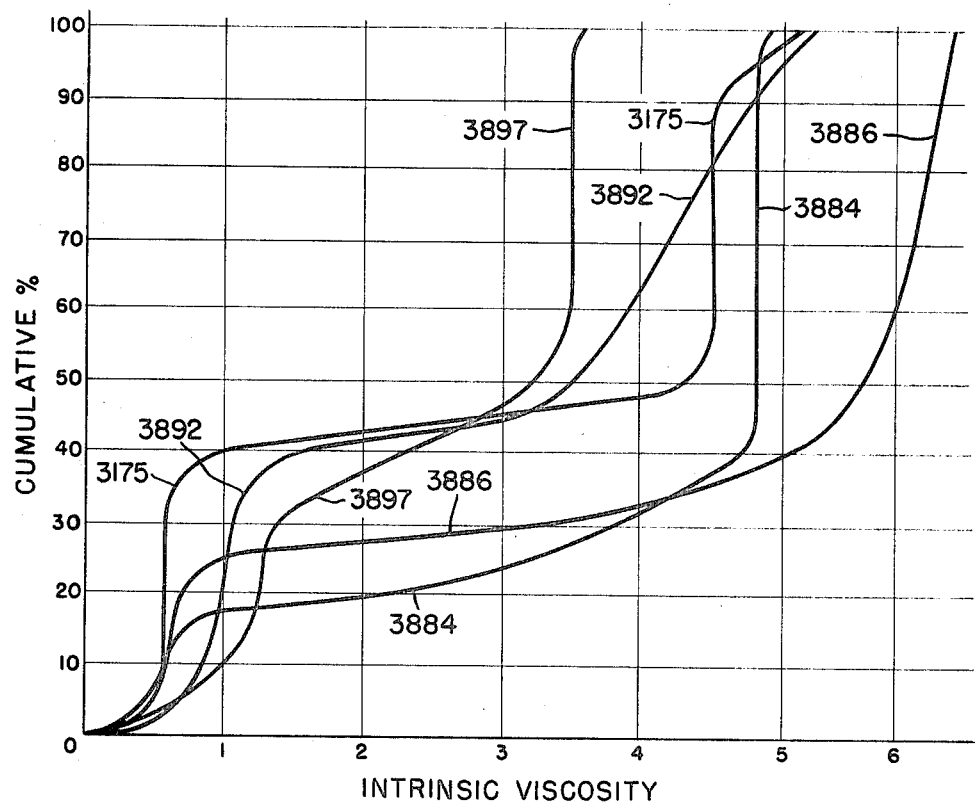

| No. | DBB, pcm. | Lag, min. | Conversion, percent | Viscosity | Curve No. in Fig. 2 |
| --- | --- | --- | --- | --- | --- |
| 1 | 0.10 | 10 | 67 | 4.03 | 3,884 |
| 2 | 0.10 | 20 | 70 | 3.33 | |
| 3 | 0.10 | 30 | 80 | 2.66 | 3,897 |
| 4 | 0.11 | 20 | 65 | 3.70 | 3,892 |
| 5 | 0.12 | 10 | 56 | 4.81 | 3,886 |

Comparison of tests 1 and 5 and 2 and 4 shows the effect of the increase of the quantity of adjuvant: decrease of total conversion in 3 hours, increase of viscosity and thus of the mean molecular weight. Increase of the lag at introduction has the opposite effect as is shown on comparison of tests 1, 2, 3. The curves show clearly the bimodal distribution of the polymers. In this example, the ratio $X/L$ varies between 0.74 and 0.90.

EXAMPLE 3

Solvent: toluene (180 cm.$^3$)
Polar compound: tetrahydrofurane at the rate of 1 pcm.
Monomers: butadiene and styrolene: 12.75 g. total of which 23% is styrolene
Catalyst: n-butyl-lithium at the rate of 0.08 pcm.
Adjuvant: allyl bromide in variable quantity
Temperature: 55° C.
Total duration: 3 hours This example differs from Example 1 by the use of two monomers, one a conjugated diene and one an aromatic vinyl compound. On the other hand, there were used traces of polar compound in order to improve the relative reactivities of the catalyst with regard to the two monomers.

Table III furnishes the data on some tests as well as the corresponding results:

TABLE III

Figure 3:
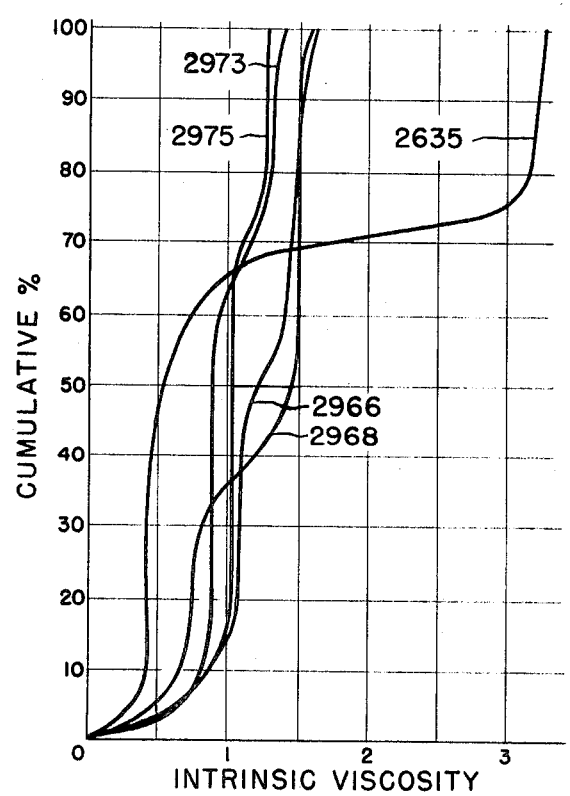

| No. | BrA, pcm. | Lag, min. | Conversion, percent | Viscosity | Curve No. in Fig. 3 |
| --- | --- | --- | --- | --- | --- |
| 1 | 0.08 | 0 | 99 | 2.25 | |
| 2 | 0.10 | 0 | 77 | 4.82 | |
| 3 | 0.08 | 10 | 100 | 1.40 | 2,966 |
| 4 | 0.10 | 10 | 99 | 1.48 | 2,968 |
| 5 | 0.08 | 20 | 99.5 | 1.19 | 2,973 |
| 6 | 0.10 | 20 | 100 | 1.32 | 2,975 |

The tests may be compared to those in Example 1. The curves are also similar though corresponding to distributions which are quite different from one another. Still, between the curves pertaining to Example 1 and those pertaining to Example 3 one will find quite a marked difference in structure. In the case of Example 1, the zone of transition between the fraction with the low molecular weight and the fraction with the high molecular weight is very distinct: there is practically no intermediate fraction. In contrast thereto, in Example 3, there is a considerable intermediate fraction noticeable.

EXAMPLE 4

Solvent: toluene (180 cm.$^3$)
Polar compound: tetrahydrofurane (0.5 pcm.)
Monomers: butadiene (9.80 g.) and styrolene (2.95 g.)
Catalyst: 0.08 pcm. of n-butyl lithium
Adjuvant: allyl bromide (0.11 pcm.) introduced 30 minutes after the start of polymerization
Temperature: 55° C.
Total duration: 3 hours In contrast to the provisions in Example 3, the butadiene is introduced in two installments, half in the beginning and the other half after 30 minutes and at the same time as the allyl bromide. After three hours, conversion of 82% is obtained. The copolymer has an inherent viscosity of 1.65. It comprises 20.6% styrolene. Curve 2635 in FIG. 3 shows the distribution of the molecular weights. One finds that there is present 70% product having low viscosity (about 0.50) and 30% product having high viscosity (about 3.20).

EXAMPLE 5

Solvent: toluene (180 cm.$^3$)
Polar compound: tetrahydrofurane (0.50 pcm.)
Monomers: butadiene (9.80 g.) and styrene (2.95 g.)
Catalyst: 0.08 pcm. of n-butyl lithium
Adjuvant: allyl bromide
Temperature: 55° C.
Total duration: 4 hours In this example, one starts polymerization with half of the solvent and of the polar compound, all of the styrene, half of the butadiene and all of the catalyst. At the time one introduces the allyl bromide one also introduces the second half of the solvent and of the polar compound as well as of the butadiene. The quantities indicates above refer to the total quantities used.

Table V below furnishes the results obtained.

TABLE V

| No. | BrA, scm. | Lag, min. | Conversion, percent | Content of styrolene | Viscosity | Curve No. in Fig. 1 |
| --- | --- | --- | --- | --- | --- | --- |
| 1 | 0.08 | 25 | 94.2 | 20.8 | 1.35 | 2,983 |
| 2 | 0.10 | 25 | 94.7 | 22.1 | 1.58 | 2,984 |
| 3 | 0.08 | 35 | 98.9 | 23.0 | 1.13 | 2,987 |

In this example, the fraction with the low molecular weight is clearly scantier than in the two preceding examples.

EXAMPLE 6

Solvent: heptane (180 cm.$^3$)
Polar compound: hexamethyl phosphorotriamide (0.10 pcm.)

Monomers: butadiene and styrolene (11.9 g. with 23% styrolene)
Catalyst: n-butyl lithium (0.06 pcm.)
Adjuvant: allyl bromide in variable quantity but introduced in all tests after 18 minutes
Temperature: variable
Total duration: 3 hours In this example, only the adjuvant was introduced belatedly, each time after 18 minutes. On the other hand, one varies the temperatures at the same time one introduces the adjuvant. Table VI furnishes the details and the results of each test.

TABLE VI

Figure 4:
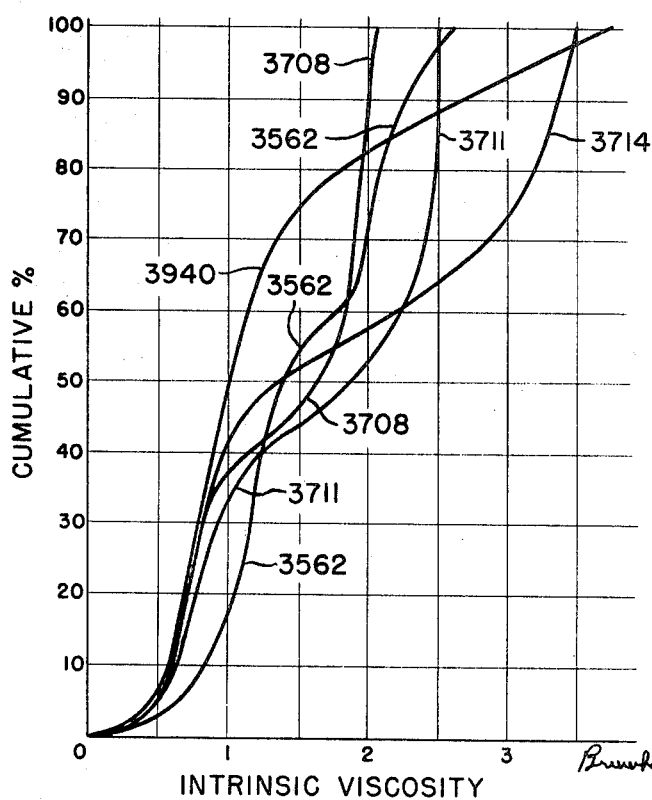

| Test | BrA, pcm. | Starting temperature, °C. | End temperature, °C. | Conversion, percent | Styrolene percent | Mooney | Viscosity | Curve No. in Fig. 4 |
|---|---|---|---|---|---|---|---|---|
| 1 | 0.06 | 35 | 35 | 84.3 | 23 | 55 | 1.82 | 3,562 |
| 2 | 0.05 | 30 | 40 | 95.7 | 23 | 31 | 1.60 | |
| 3 | 0.06 | 30 | 40 | 95.3 | 23 | 49 | 1.74 | 3,708 |
| 4 | 0.07 | 30 | 40 | 94.7 | 23 | 55 | 1.87 | 3,711 |
| 5 | 0.08 | 30 | 40 | 86.6 | 23 | 49 | 2.07 | 3,714 |

The curves show that the distribution of the molecular weights is spread much wider than in the preceding examples and that, on the other hand, the separation of the fractions with high and with low molecular weights though clear is not very distinct.

EXAMPLE 7

Solvent: toluene (180 cm.³)
Monomer: butadiene (12.75 g.)
Catalyst: n-butyl lithium (0.08 pcm.)
Adjuvant: allyl bromide in variable quantity but introduced after 10 minutes
Temperature: 55° C.
Total duration: 3 hours 10 minutes

| No. | BrA, pcm. | Conversion, percent | Viscosity | Curve No. in Fig. 2 |
|---|---|---|---|---|
| 1 | 0.08 | 98 | 1.47 | |
| 2 | 0.10 | 98 | 2.0 | |
| 3 | 0.11 | 98 | 2.30 | |
| 4 | 0.12 | 97.5 | 3.17 | 3,175 |

This example is similar to Example 1. Curve 3175 shows, as do curves 2945 and 2947, a bi-modal polymer. But this time there is a big difference in the molecular weight between the fraction having a low molecular weight and the fraction having a high molecular weight which each comprises close to one half of the polymer. It is quite obvious that all intermediate cases may be obtained by suitable adjustment of the concentrations of the reagents and the lag in the introduction of the halogen adjuvant.

EXAMPLE 8

Solvent: heptane (180 cm.³)
Monomer: butadiene (11.9 g.)
Catalyst: n-butyl lithium (0.08 pcm.)
Adjuvant: benzyl chloride (0.10 pcm.) introduced after 20 minutes
Temperature: 55° C.
Total duration: 3 hours In this example, one uses an adjuvant with progressive and slow action. Within three hours one obtains a rate of conversion of 36.5% and a viscosity of 1.17. Curve 3940 (FIG. 4) shows the distribution of the molecular weights. One finds that there is present a fraction having a low molecular weight corresponding to approximately 60% of the polymer and a fraction with a molecular weight which increases regularly and attains a molecular weight corresponding to a viscosity of 3.8.

What is claimed is:

1. A process for the in situ preparation of polymers having a polymodal molecular weight distribution which comprises polymerizing a conjugated diene monomer compound dissolved in a hydrocarbon solvent medium therefor containing an organic lithium polymerization catalyst dissolved in a solvent therefor in a concentration of from about 0.01 to about 0.20 molar equivalents of lithium per 100 moles of monomer and when a fraction ranging from about 20% to about 80% of the monomer has polymerized then adding to the solvent medium an organic halide having at least one mobile halogen atom selected from the class consisting of 1,4-diiodo-2-butene, 1,4-dibromo-2-butene, 3,4-dibromo-1-butene, 1-bromo-2-butene, allyl iodide, allyl bromide, allyl chloride and benzyl chloride, the ratio of the total number of halogen atoms to the total number of lithium atoms being between about 0.1 to about 1.

2. The process as defined by claim 1 wherein the solvent medium contains a mixture of conjugated diene monomer compounds.

3. The process as defined by claim 1 wherein the solvent medium contains at least one conjugated diene monomer compound and at least one aromatic vinyl monomer compound.

4. The process as defined by claim 1 wherein the solvent medium contains a small amount of a non-protogenic polar compound selected from the class consisting of diethyl ether, dioxane, tetrahydrofurane, triethyl amine and hexamethyl phosophorotriamide.

5. The process as defined by claim 1 wherein the conjugated diene monomer compound is butadiene.

6. The process as defined by claim 3 wherein the aromatic vinyl monomer compound is styrene.

7. The process as defined by claim 1 wherein the organic lithium polymerization catalyst is n-butyl lithium.

8. The process as defined by claim 1 wherein the organic halide is allyl bromide.

9. The process as defined by claim 1 wherein the organic halide is 1,4-dibromo-2-butene.

10. The process as defined by claim 1 wherein the organic halide is benzyl chloride.

11. The process as defined by claim 1 wherein the organic halide is added all at once.

12. The process as defined by claim 1 wherein the organic halide is added in several portions.

13. The process as defined by claim 1 wherein the organic halide is added continuously.

14. The process as defined by claim 1 wherein the conditions of polymerization are modified at the time the organic halide is added.

References Cited

UNITED STATES PATENTS

| 3,429,829 | 2/1969 | Kahle | 260—94.2M |
| 3,072,621 | 1/1963 | Pampus et al. | 260—83.7 |
| 3,149,099 | 9/1964 | Groene et al. | 260—94.2M |
| 3,198,774 | 8/1965 | Huxtable et al. | 260—83.7 |
| 3,318,862 | 5/1967 | Hinton | 260—94.2M |

FOREIGN PATENTS

| 675,016 | 11/1963 | Canada | 260—94.2M |

JAMES A. SEIDLECK, Primary Examiner

U.S. Cl. X.R.

260—84.7, 94.6, 94.2